Figure 1:
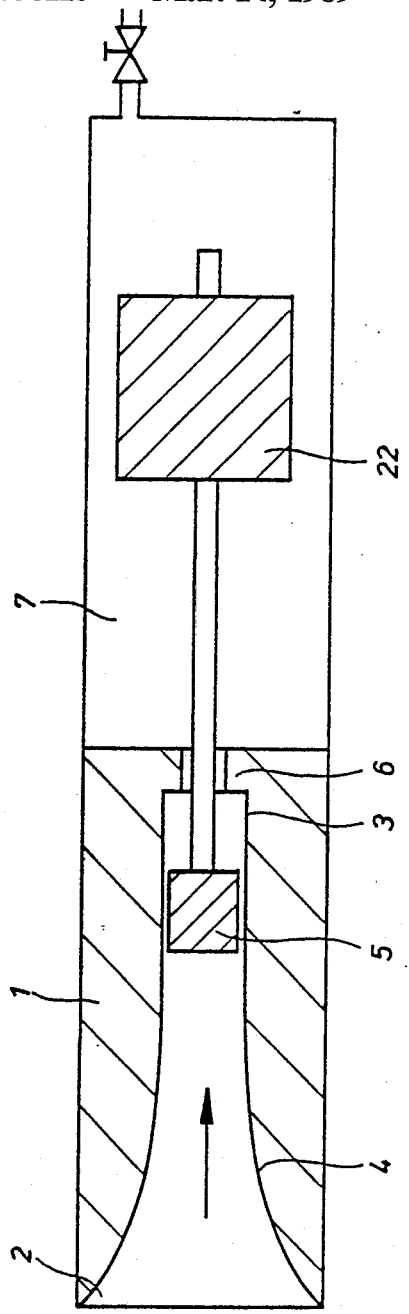

United States Patent [19]

Meier et al.

[11] Patent Number: 4,811,815
[45] Date of Patent: Mar. 14, 1989

[54] PROCESS AND A DEVICE FOR HYDRODYNAMIC SOUND PULSE GENERATION IN A LIQUID

[75] Inventors: Gerd Meier; Andreas Laake, both of Göttingen, Fed. Rep. of Germany

[73] Assignee: 501 Max-Planck-Gesellschaft Zur Forderung der Wissenchaften E.V., Gottingen, Fed. Rep. of Germany

[21] Appl. No.: 29,758
[22] PCT Filed: Jun. 12, 1986
[86] PCT No.: PCT/DE86/00246
§ 371 Date: Feb. 27, 1987
§ 102(e) Date: Feb. 27, 1987
[87] PCT Pub. No.: WO87/00296
PCT Pub. Date: Jan. 15, 1987

[30] Foreign Application Priority Data

Jun. 29, 1985 [DE] Fed. Rep. of Germany ....... 3523324

[51] Int. Cl.[4] .............................................. H04R 1/02
[52] U.S. Cl. .................................... 181/120; 367/146; 181/402
[58] Field of Search .............. 181/113, 118, 120, 121, 181/401, 402, 142, 110; 367/141, 143, 144, 146, 142, 148

[56] References Cited

U.S. PATENT DOCUMENTS

| | | | |
|---|---|---|---|
| 3,403,374 | 9/1968 | Mellen et al. | |
| 3,642,089 | 2/1972 | Parker et al. | 181/120 |
| 3,679,021 | 7/1972 | Goldberg | 367/146 |
| 3,690,403 | 9/1972 | Davis | 181/.5 |
| 3,741,333 | 6/1973 | Muniz | 181/142 |
| 3,949,831 | 4/1976 | Cassand et al. | 367/146 |
| 3,993,974 | 11/1976 | Silverman | |
| 4,007,804 | 2/1977 | Hardison et al. | |
| 4,047,592 | 9/1977 | Sieber et al. | 181/142 |
| 4,202,425 | 5/1980 | Hambrick, Sr. et al. | 181/120 |

FOREIGN PATENT DOCUMENTS 2921362 12/1980 Fed. Rep. of Germany .
2359350 2/1978 France .

Primary Examiner—Brian S. Steinberger
Attorney, Agent, or Firm—Price, Gess & Ubell

[57] ABSTRACT

A process and a device for hydrodynamic sound pulse generation in a liquid, in particular for sound pulse generation at sea for marine geophysics measurements. In an pipe (1), open on one end, which surrounds a liquid column of a specific length and which makes contact with the liquid at the end of the liquid column opposite the open end (2) of the pipe, the end of the liquid column opposite the open end (2) of the pipe is struck in bursts by an axial compressive force, either with the liquid column being accelerated in the direction opposite the open end (2) of the pipe and subsequently being decelerated at its end opposite the open end of the pipe, for example, by a piston (5) which is accelerated together with it and which strikes a stop (6), or with the liquid column being abruptly hit on the end opposite the open end (2) of the pipe by an auxiliary mass, previously accelerated in the direction of the open end of the pipe and abruptly decelerated in such a way that a sound pressure pulse is generated at this end of the liquid column through the abrupt acceleration; this pulse is transmitted in the liquid column to the open end (2) of the pipe and from there is radiated, on the one hand, as a sound pulse in the liquid, and is reflected, on the other hand, as a rarefaction wave into the liquid column. The rarefaction wave generates cavitation in the pipe (1) which attenuates undesirable post-pulse oscillations.

7 Claims, 9 Drawing Sheets

PROCESS AND A DEVICE FOR HYDRODYNAMIC SOUND PULSE GENERATION IN A LIQUID

BACKGROUND OF THE INVENTION

1. Field of the Invention

The invention concerns a process and a device for hydrodynamic sound pulse generation in a liquid, in particular for sound pulse generation at sea for marine geophysics measurements.

2. Description of Related Art

Although the invention is used preferably for sound pulse generation at sea for marine geophysics measurements, it is also suitable for other applications requiring hydrodynamic sound pulses, namely water depth measurement, using the echo sounding procedure, or even therapeutic and medical underwater treatments.

At the present time, sound pulses in liquids are generated through pulsed input of sound energy. This is achieved mostly by means of spark discharges or detonation of special explosives within the liquid. Generally speaking, however, piezoelectric and magnetostrictive sound generation cannot deliver strong sound pulses due to their limited amplitudes. Additional possibilities exist for aerodynamic sound pulse generation. A quantity of compressed air is introduced into the surrounding liquid. The increase in pressure in the liquid is due to the expansion of the compressed air and the resultant displacement of the liquid generates a sound wave. Sound pulse generation can be also generated through the collapse of cavitation bubbles.

Using known processes, however, a strong waved pressure signal which causes interference from multiple pulses is created. Moreover, the frequency range of the sound signal is, for the most part, limited to a few hertz and, therefore, is only marginally suited to examination of frequency-dependent dimensions such as, for example, the attenuation of sound waves at the bottom of the sea. Furthermore, the energy requirement for generating a desired sound intensity is high.

This invention meets the requirement of creating a process and a device by means of which strong sound pulses, sharply delimited in time, can be generated in the liquid, with higher bandwidths from the sound frequency spectrum and relatively low energy consumption.

In the process according to the invention: In a pipe open on one end, which surrounds a liquid column of a specified length that makes contact with the liquid at the open end of the pipe, the end of the liquid [column-]opposite the open end of the pipe is subjected to sudden bursts of acceleration or deceleration in such a way that a sound pressure pulse is generated at this end of the liquid column; this pulse is transmitted through the liquid column to the open end of the pipe and from there it is radiated, on the one hand, into the liquid as a sound pulse, and is reflected, on the other hand, into the liquid column as a rarefaction wave.

According to the invention, the sound pulses are generated through the use of the well-known water hammer, which results from a very rapid change of flow inside a pipe within a time interval, which, according to Joukowski, must be shorter than twice the length of the pipe divided by the velocity of sound in the liquid. Under this condition, the liquid in the vicinity of the rapid change of flow becomes compressed, creating a sound wave, which causes, for example in pipes and other conduits of a pipe system, a knocking sound which can be very bothersome. In contrast, according to the invention, the water hammer is used for hydrodynamic sound pulse generation in a liquid, with the sound pressure pulse generated using the water-hammer principle radiated through the open end of a pipe into the liquid.

Simultaneously, a reflection occurs at this pipe end, and since it is an acoustically open pipe end, the pressure wave caused by the water hammer is reflected with a 180 degree phase angle shift, i.e., as a rarefaction wave, to the liquid column. Since this causes the pressure to fall sharply after arrival of the reflected rarefaction wave at the open end of the pipe, the rear flank of the emitted sound pulse drops steeply and this sharply delimits the radiated sound pulse in time. The duration of the transmitted sound pulse is thus determined by the length of the liquid column. Because of the rectangularity of the pressure signal obtained, the frequency spectrum includes, in addition to a primary frequency, its odd-numbered multiples as well as frequencies based on longitudinal waves in the pipe. On the whole, the result is a relatively high bandwidth for the radiated sound frequency spectrum. At the same time, the energy consumed for generating the sound pulse is relatively low since, by using the water hammer, pressures are generated that are many times greater than the excitation pressure.

To generate the water hammer at the end of the liquid column opposite the open end of the pipe, it is possible either to accelerate the liquid column in the direction opposite the open end of the pipe, and then abruptly decelerate it at the end opposite the open end of the pipe, or to permit an auxiliary mass, which has been previously accelerated in the direction of the open end of the pipe, to strike the end of the liquid column opposite the open end of the pipe abruptly. Both actions result in the compression desired according to the invention in the direction of the axis of the liquid column at the end opposite the open end of the pipe.

Furthermore, the invention offers the possibility of suppressing oscillation of the liquid in the liquid column after the radiation of the sound pulse, so that the radiated sound pulse is a single pulse without interference from multiple pulses. To facilitate this, in the refinement of the process according to the invention for generating the sound pulse, the end of the pipe opposite the open end is sealed by reverberation, which causes the rarefaction wave, originally created at the open end of the pipe through reflection, to be reflected again against the acoustically sealed pipe end without a phase angle shift as a rarefaction wave. The latter generates cavitation in the liquid column by which the subsequently reflected pressure wave at the open end of the pipe, following the reflection of this rarefaction wave, is attenuated, since the velocity of the sound is reduced by the cavitation.

The preferred device for the execution of the process according to the invention is, according to the invention, characterized by a pipe, open on one end, which surrounds a liquid column of a specified length which makes contact with the liquid on the open end of the pipe. The pipe is made of a material of low elasticity with a high mass moment of inertia and is bell-shaped at the open end. It is also characterized by a device which generates, in bursts, a compressive force for striking the end of the column opposite the open end of the pipe in the direction of its axis in order to cause sudden acceleration or deceleration of the liquid column, so that the sound pressure pulse, explained in connection with the description of the process, is generated. Since the pipe is made of a material with low elasticity, pressure changes due to cross-sectional changes in the pipe become negligible and, as a result, so become transverse waves transferred to the wall of the pipe, which have a different frequency spectrum and duration than the radiated sound pulse. Furthermore, since the pipe is made of a material with high mass moment of inertia, it is possible to prevent inducing a significant axial motion of the pipe, caused by a recoil pulse resulting from the generation of the compressive force, which would considerably weaken the water hammer pressure. It is preferable that the mass moment of inertia of the pipe be equal to at least 10 to 20 times the mass moment of inertia of the liquid column.

Moreover, since the open end of the pipe is shaped like a bell, a significant jump in impedance is prevented at the point of radiation of the sound pulse, and a good match of the sound waves in the pipe with the flat waves in the far field of the pipe opening is achieved through a gradual widening of the bell, which allows the pipe waves from the narrowest cross section of the pipe to spread out, without a jump, to an area whose diameter corresponds to, approximately, the wavelength of the primary frequency of the radiated sound pulses. In this case, the reflection to the open bell end becomes minimal, whereas the attenuation of the waves in the pipe, after radiation of the sound pulse, becomes maximal. It is preferable that the bell take the shape of a hyperbolic funnel.

It is obvious that, for the hydrodynamic generation of sound pulses according to the invention, the external appearance of the pipe has no particular significance. Therefore, a hole in an otherwise solid body can also fall under the designation of "pipe", as used here.

The length of the liquid column is greater than the diameter of the end of the liquid column opposite the open end of the pipe, preferably more than double this diameter. However, if very short pulses must be generated, the liquid column can be shorter than the diameter.

In a first embodiment of the device according to the invention, the device for generating the compressive force has a drive mechanism, for accelerating the liquid column in the direction opposite the open end of the pipe, and a piston which can be accelerated together with the liquid column and which works in conjunction with a stop for sudden deceleration of the end of the accelerated liquid column opposite the open end of the pipe. Thus, at the beginning of the acceleration of the liquid column, the piston is located in its home position, axially, at a distance from the stop. It can be equipped with a gripping device or the like to set the piston in the home position.

The drive mechanism can have an adjustable space at a lower pressure than that of the liquid in the liquid column next to the piston opposite the liquid column. For setting the piston in its home position, this space can initially be brought to relatively high pressure; then it can be deaerated to maintain the low pressure, so that the piston is accelerated toward the end of the pipe opposite the open end of the pipe under the pressure of the liquid along with the liquid confined by it.

It is also possible to equip the device with a tow link by means of which the pipe, with its bell pointing in the towing direction, is dragged through the liquid in order to accelerate the liquid and the piston in its home position. In this embodiment, there is a discharge area which opens into the liquid on the side of the piston opposite the open end of the pipe and out of which the liquid displaced by the piston can drain.

The piston can also work as a valve device in a two-way valve in conjunction with a valve seat which is located on the end of the liquid column opposite the open end of the pipe and whose valve opening opens into a discharge channel on the side of the valve seat opposite the open end of the pipe. This channel houses a flow drive mechanism to accelerate the liquid column in the direction opposite the open end of the pipe. The valve, in its open position, is located downstream from the valve seat and can be carried along by the accelerated liquid column all the way to impact on the valve seat. For resetting the piston in its home position, the flow drive mechanism can be reversible.

In a second, preferred embodiment of the device according to the invention the device for generating the compressive force has an acceleration device for accelerating an auxiliary mass and a device for allowing the accelerated auxiliary mass to strike the end of the liquid column opposite the open end of the pipe in the direction of the axis leading to the open end of the pipe.

This auxiliary mass can be a solid percussive body which works in conjunction with a piston by means of which the end of the liquid column opposite the open end of the pipe is axially confined and which is movable in the pipe all the way to impact a stop. After the percussive body is released, it strikes the end of the piston opposite the open end of the pipe in such a way that the piston is accelerated toward the open end of the pipe, thus accelerating the liquid column in front of it. In this embodiment, the mass of the percussive body is greater than the mass of the liquid column. Typically, it is 10 to 20 times the mass of the liquid column.

However, in this second embodiment, the auxiliary mass can also be a liquid mass. For example, the acceleration device can have a circular channel, wherein the interior of the pipe opens tangentially into the end of the pipe, and a flow drive mechanism for accelerating a liquid mass located in the circular channel and forming the auxiliary mass. The flow drive mechanism can be located downstream from the opening in the circular channel and a manipulable shut-off device can be provided, by means of which a cross section of the circular channel located downstream from the opening can be shut off after acceleration of the liquid mass. In this case, the flow direction in the circular channel is such that, after activation of the shut-off device, the circular flow is diverted tangentially into the pipe and thus strikes the end of the liquid column opposite the open end of the pipe.

In all embodiments of the device according to the invention, corresponding devices can be provided for cyclical repetition of the generation of sound pressure pulses.

The invention is explained using embodiments which are made clear by the drawings.

Figure 2:
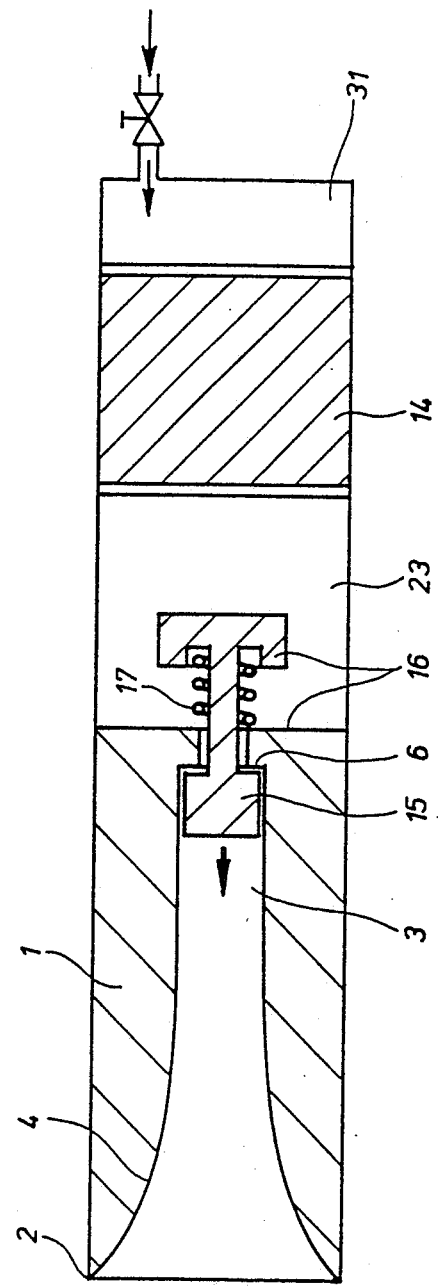
Figure 7:
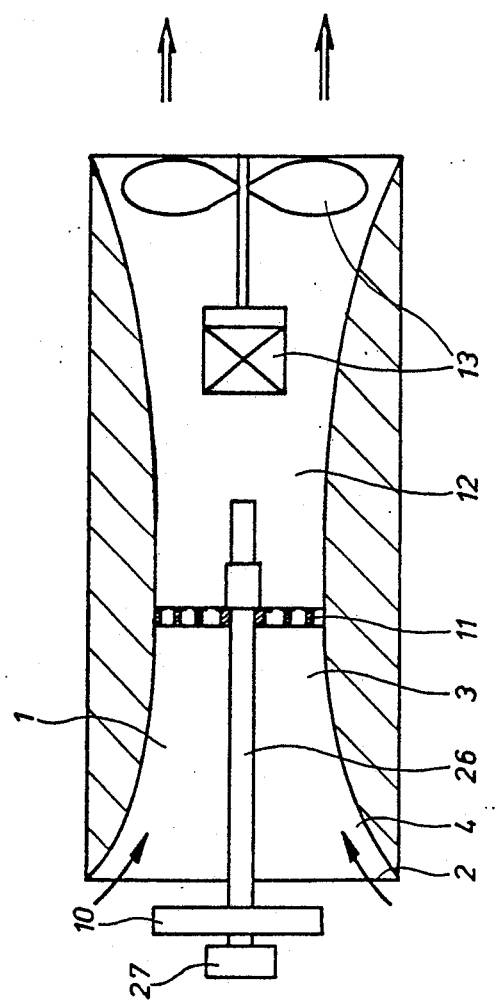
Figure 8:
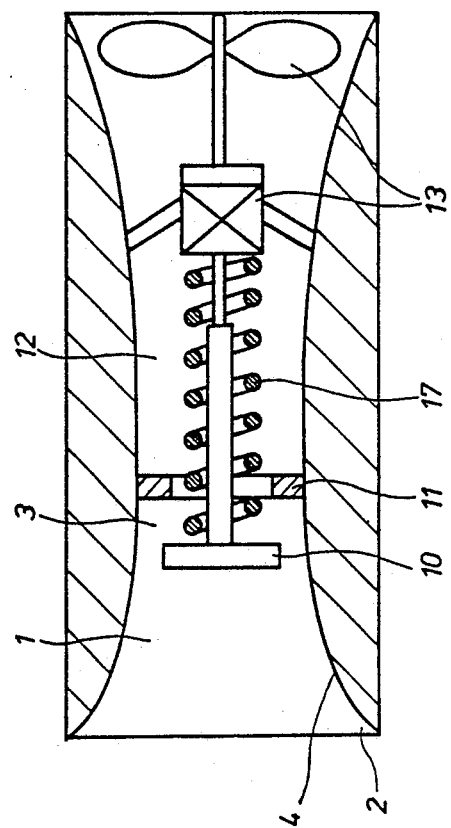
Figure 9:
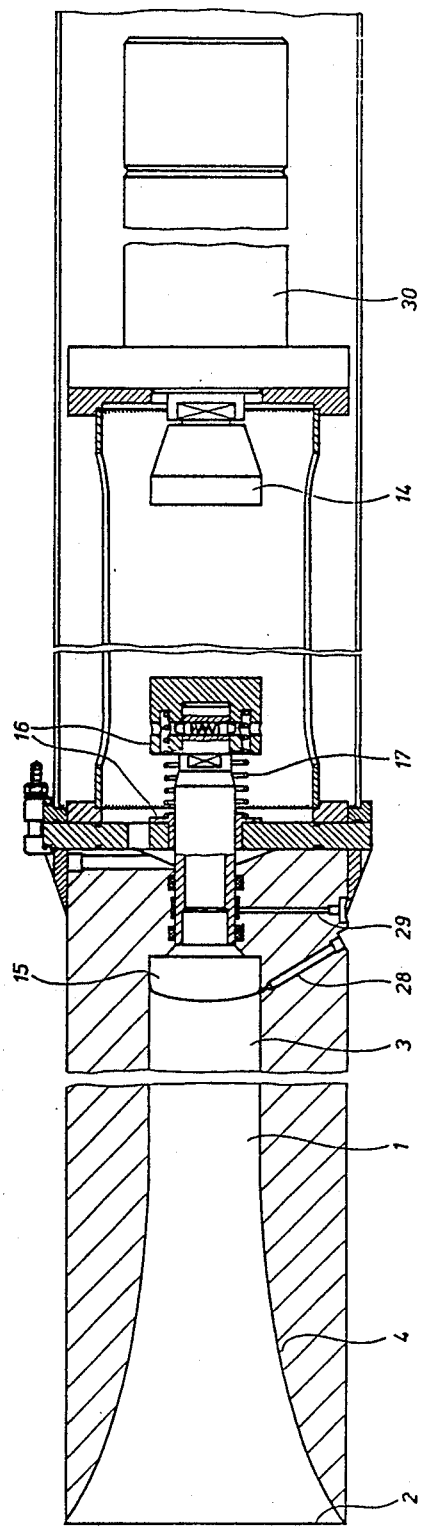

FIGS. 1 through 8 show the basic design of one embodiment of the sound pulse generator according to the invention, and FIG. 9 shows a structural embodiment of the sound pulse generator from FIG. 2 in longitudinal section.

The embodiments of the hydrodynamic sound pulse generator, which are schematically illustrated in the drawings, have a pipe 1, which is open on one end 2 in such a way that a liquid column of a specified length is confined in pipe 1 when pipe 1 is submerged in a liquid. For liquid sound pulse generation, the liquid column is struck in bursts on he end opposite the open end 2 of the pipe with a compressive force in the direction of the axis of the pipe, in such a way that a sound pulse is generated at this end of the liquid column. This pulse is transmitted through the liquid column to the open end 2 of the pipe and from there it is radiated into the liquid. For generating the axial compressive force, the liquid column in the embodiments shown in FIGS. 1 and 4 through 8 is accelerated along the direction of the axis at the opposite end 2 of the pipe and then suddenly decelerated at the end 3 of the pipe opposite the open end 2 of the pipe; and in the embodiments in FIGS. 2, 3 and 9 an auxiliary mass is accelerated which is then allowed to abruptly strike the end of the liquid column opposite the open end 2 of the pipe in the direction of the axis leading to the open end 2 of the pipe. Pipe 1 is made of a material of the lowest possible elasticity, so it can be viewed as a rigid body. Cross-sectional changes in the pipe, caused by the change in pressure resulting from the water hammer and the consequent development of transverse waves in the wall of the pipe, can be considered negligible. Furthermore, pipe 1 has the highest possible mass moment of inertia, so that the recoil pulse acting on pipe 1 with the sudden generation of the sound pressure pulse will not lead to a transverse motion of pipe 1 which would weaken significantly the sound pressure pulse generated. Moreover, the interior of pipe 1 expands hyperbolically toward open pipe end 2, so that pipe 1 forms a bell 4 at the open end 2 of the pipe to achieve the best possible match between the flat waves in the pipe and the flat waves in the far field of the pipe opening.

In the embodiment shown in FIG. 1, a piston 5 is located at the end 3 of the pipe opposite the open end 2 of the pipe. This piston 5 is introduced with a tight seal into pipe 1, and behind it, a gas space 7, with low pressure as compared to the pressure of the liquid in the liquid column which is adjustable by means of piston 5, is formed in the direction opposite that of the open end of the pipe. A stop 6, working in conjunction with piston 5, is located at the end 3 of the pipe opposite the open end 2 of the pipe. By means of a gripping device 22 on the piston rod of piston 5, piston 5 can be moved against the pressure of the liquid into a home position, where it is located at a distance from stop 6. When gripping device 22 is then released and space 7 is placed under sufficiently low pressure, piston 5 is accelerated together with the liquid column in the pipe in the direction opposite the open end 2 of the pipe. This is due to the differential between the pressure of the liquid in the liquid column in pipe 1 and the pressure of the gas in space 7, until piston 5 is abruptly stopped by stop 6. Thus, the end of the liquid column opposite the open end 2 of the pipe accelerated along with piston 5 is so suddenly decelerated that the water hammer, i.e., the sound pulse which radiates into the surrounding liquid, is generated. Afterwards, piston 5 can be moved back to its home position by means of gripping device 22 for generating another sound pulse.

In the embodiment shown in FIG. 2, a piston is located on the end 3 of the pipe opposite open end 2 of the pipe. This piston can move into the end 3 of the pipe with a tight seal and is pressed by a readjusting spring 17 against stop 6, which works in conjunction with transfer piston 15 at the end 3 of the pipe. In the direction opposite the open end 2 of the pipe behind piston 15, there is a gas space 23, into which piston 15 extends with an anvil section attached to the end of its piston rod, which works in conjunction with the adjacent face of pipe 1 as a stop 16 for limiting the piston's travel. Located in gas space 23 is a percussive body, placed at a distance behind the anvil section of piston 15. The side of the percussive body opposite piston 15 confines a pressurized space 31 under high pressure. When this pressurized space 31 is supplied with pressure, percussive body 14 is accelerated toward the piston 15 until it hits the anvil section of piston 15. Thus, piston 15 strikes the end of the liquid column enclosed in the pipe and opposite the open end 2 of the pipe generating the sound pressure pulse. Then, percussive body 14 can be returned to its home position by means of a gripping device not shown in FIG. 2, while piston 15 is moved by spring 17 back to its home position, where it rests against stop 6.

Figure 3:
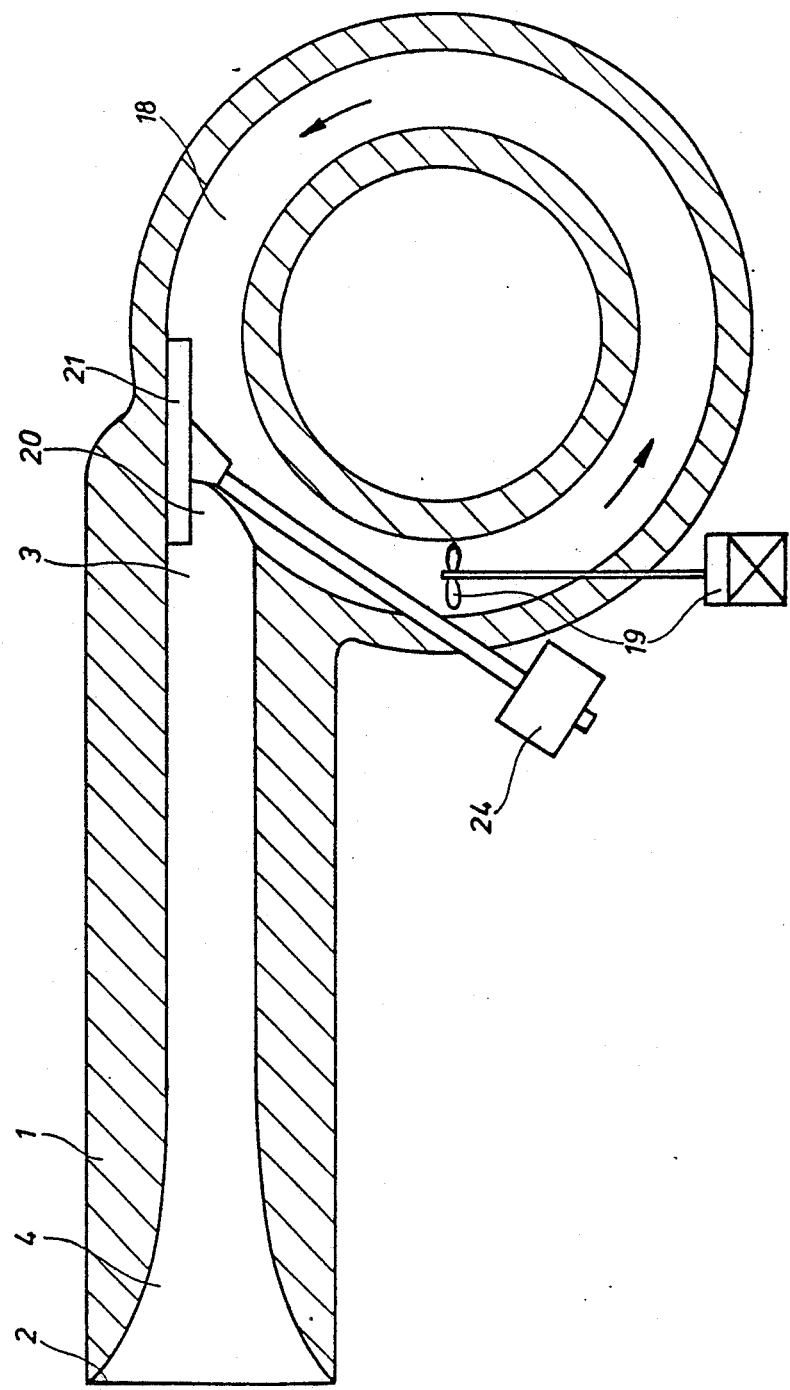

In the embodiment shown in FIG. 3, an auxiliary mass is likewise accelerated; in this case it is, however, a liquid mass. At the end 3 of the pipe opposite the open end 2 of the pipe, end 3 opens tangentially into a self-contained circular channel 18, in which the liquid can be accelerated in the direction of the arrows shown in FIG. 3 by means of a flow drive mechanism 19 for creating circular flow. Flow drive mechanism 19 is located downstream from opening 20 of pipe 1 in the direction of the circular flow in circular channel 18. Furthermore, a shut-off device is provided which is adjustable outside the home position shown in FIG. 3 by means of a shut-off control mechanism 24, in such a way that the cross section of circular channel 18, located immediately downstream from opening 20 of pipe 1, can be shut off. This diverts the circular flow at opening 20 into the tangentially connected pipe 1 in such a way that the liquid mass, previously accelerated in ring channel 18, suddenly strikes the liquid column which had been at rest at the end 3 of the pipe, thus generating the sound pressure pulse.

Figure 4:
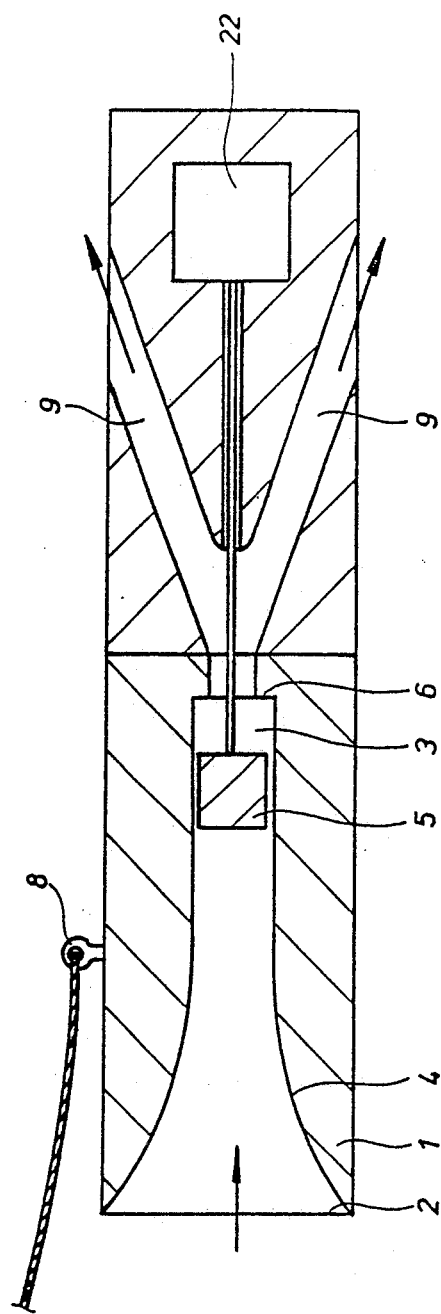

The embodiment shown in FIG. 4, corresponds essentially to the one in FIG. 1. However, FIG. 4 shows, behind piston 5, a liquid filled discharge space 9 and a tow link 8 for a cable on pipe 1, by means of which the device can be towed through the water by a ship or some other towing device. When piston 5 has been returned to its home position, shown in FIG. 4, by means of gripping device 22 and is then released from it, the liquid column present in pipe 1 is accelerated together with piston 5, thus displacing the water from discharge space 9 according to the movement of the piston, until piston 5 strikes stop 6 and suddenly decelerates the end of the liquid column opposite the open end 2 of the pipe, generating the sound pressure pulse.

Figure 5:
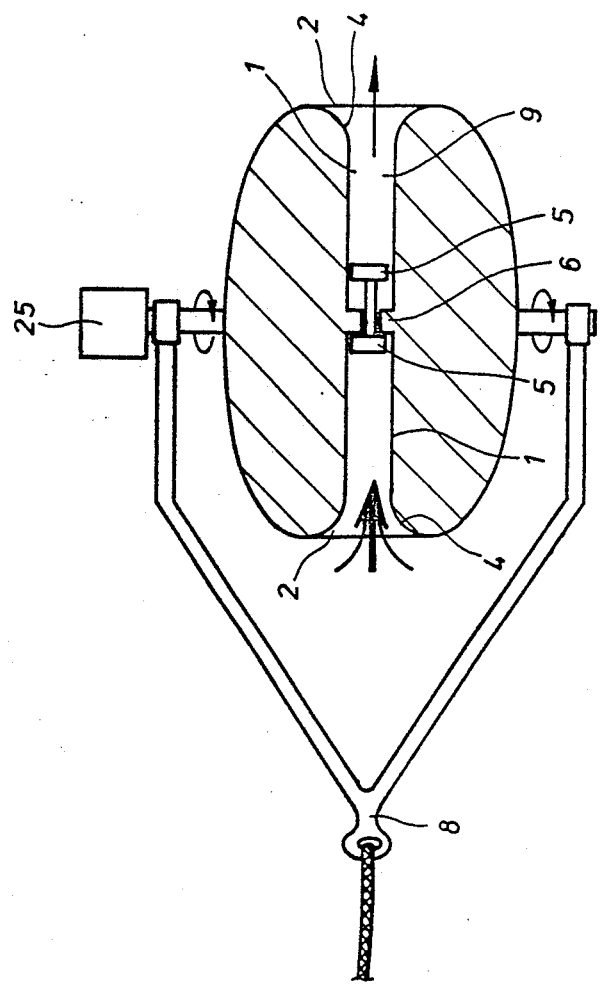

The device shown in FIG. 5 also works according to the same principle as that in FIG. 4. However, in FIG. 5 discharge space 9 is made up of a second pipe 1, whose bell 4 is arranged opposite that of the first pipe 1. Moreover, the body of the device is rotatable by at least 180 degrees relative to towing link 8 by means of rotational drive 25. The two pistons 5, between which stop 6 is located, are linked together by a common piston rod. When the two pipes 1 are rotated 180 degrees by means of rotational drive 25 and out of the position shown in FIG. 5, in which left piston 5 is resting against stop 6 and right piston 5 is at a distance from stop 6, right piston 5 is accelerated under the pressure of the liquid toward stop 6, and is held there by the sudden deceleration of the liquid column in the corresponding pipe 1, which was accelerated along with it. By means of another 180-degree rotation of pipe 1, another sound pressure pulse is generated.

Figure 6:
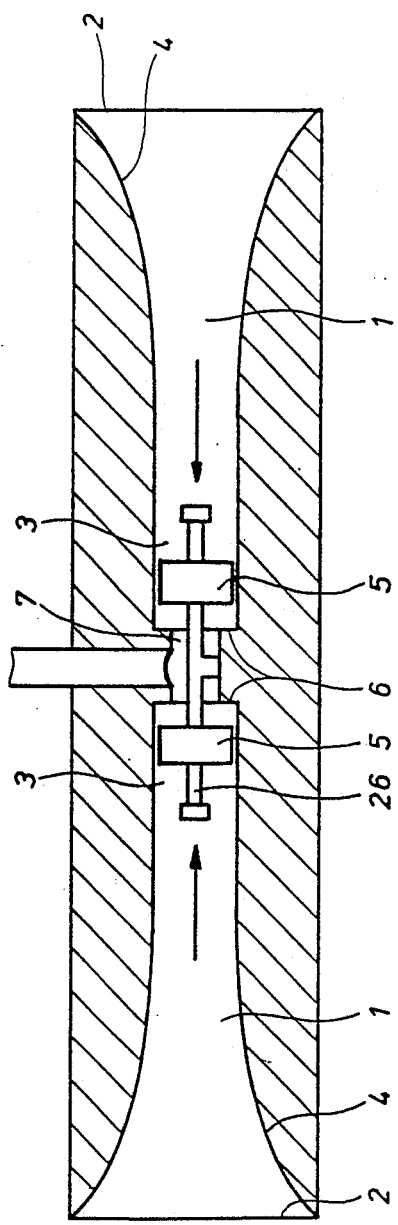

The embodiment shown in FIG. 6 presents a doubling of that in FIG. 1, with two identical pipes 1 solidly connected to each other and arranged in a mirror image on the two sides of space 7, to which low pressure can be applied. Its two pistons 5 are movable on a rod 26 solidly attached to the pipes; the rod has on each end an end stop which works in conjunction with the corresponding piston 5. By pressure impact on space 7, the pistons 5 are driven separately until they rest again the respective end stops, returning thus to their home positions. When space 7 is then suddenly deaerated, the two pistons 5 are moved simultaneously toward each other by the pressure differential until they strike the two stops 6 placed between them. In the embodiment shown in FIG. 6 two sound pressure pulses, which are radiated in two opposite directions, are thus generated simultaneously. Through the symmetric arrangement of the pipes, pulse transfer within the device is avoided so that their mass moment of inertia can be lower than with the other embodiments.

In the embodiment shown in FIG. 7, pipe 1 is composed of the intake end of an open nozzle in which a two-way valve is placed, whose valve 10 works in conjunction with a valve seat 11 in the narrowest cross section of the nozzle. In the discharge space 12 of the nozzle is located a flow drive mechanism 13 to drive the flow of the nozzle. Valve 10 is placed movably on a central rod 26. In its home position, in which it is located at a distance from valve seat 11, the valve is held by a holding device 27, which is composed preferably of an electromagnet. During operation, the liquid in the nozzle is accelerated in the direction of the arrows in FIG. 7 by means of flow drive mechanism 13. To generate the sound pulse, valve 10 is released from holding device 27 in such a way that valve 10 is drawn into the nozzle flow until it is suddenly stopped by the deceleration of the end of the liquid column opposite end 2 of the pipe downstream from valve seat 11. In this case again, the desired sound pulse is created. Valve 10 can be returned to its home position by reversing the flow drive mechanism or by means of a suitable gripping device, so that the device is ready for use again.

FIG. 8 shows an embodiment similar to that in FIG. 7 wherein valve 10 is constantly pushed in the direction of its home position by a readjusting spring 17 in which the valve is located at a distance from valve seat 11. The resiliency of readjusting spring 17 is designed so that valve 10 is set in motion by the entering liquid which is accelerated by means of flow drive mechanism 13 when a certain velocity of flow is achieved through the increasing pressure on valve 10, until it hits valve seat 11 and thus interrupts the flow. This again generates the sound pressure pulse, which is transmitted to the open end 2 of the pipe and from there is radiated, on the one hand, as a sound pulse into the liquid, and reflected, on the other hand, as a rarefaction wave. This rarefaction wave is likewise reflected toward valve 10 as a rarefaction wave. Low pressure occurs in front of valve 10, so that valve 10 is raised again from valve seat 11 by the readjusting spring and a flow is set in motion again by flow drive mechanism 13. Then, the described process is repeated. Therefore, with the device shown in FIG. 8 the desired sound pulses are generated in automatic periodic repetition. This type of automatically repeating mode of operation can be realized for the other versions of the hydrodynamic sound pulse generator shown herein through the inclusion of readjusting springs or similar devices. The embodiment shown in FIG. 5 can also be set up for a periodic mode of operation through continuous rotation of the device.

The structural embodiment shown in FIG. 9 has the same basic construction as the embodiment shown in FIG. 2. This is represented in FIG. 9 by the same reference numbers. The percussive body 14 is driven by the piston of a double action pressure cylinder 30, whose connection is not shown in FIG. 9. Through the travel of piston 15, the length of the generated sound pressure pulse is basically determined. The piston travel can be adjusted to the sound pressure pulse length.

In the embodiment shown in FIG. 9, a suction hole 28 opens in front of piston 15, so that air can be drawn which would otherwise prevent the occurrence of the water hammer. Also shown is a lubrication hole 29 to lubricate piston 15 and facilitate the most friction free and, consequently, fastest possible piston movement.

What is claimed is:

1. A device for hydrodynamic sound pulse generation in a liquid comprising:

a housing means including first and second oppositely disposed pipe means, each open at one end, the open ends being oppositely disposed, and surrounding a respective column of said liquid of a selected length each said pipe means (1) being in the shape of a bell (4) at its oppositely disposed open end;

a tow link for a towing cable;

a means for generating a compressive force for striking, in bursts and with force, the end of the liquid column opposite the open end (2) of each pipe means in the direction of its axis in order to cause sudden deceleration of the liquid column, in such a way that a sound pressure pulse is generated and transmitted in the liquid column to the open end (2) of the pipe means and from there is radiated as a sound pulse into the liquid, and is reflected as a rarefaction wave into the liquid column;

said means for generating comprising:

a piston means slidably mounted within said housing means for providing a first driving surface within said first pipe means and a second driving surface within said second pipe means, said piston means and respective driving surfaces being slidable into and out of the respective pipe means;

stop means for stopping motion of said piston means at a selected distance into either said first or second pipe means; and means attached to said tow link and said housing means for rotating said housing means by at least 180 degrees with respect to said tow link, thereby activating said position means.

2. A device for hydrodynamic sound pulse generation in a liquid, comprising:

a pipe (1) open at one end and surrounding a column of said liquid of a selected length, said pipe having the shape of a bell (4) at its open end, said bell gradually and hyperbolically widening towards the open end of said pipe, said pipe having a mass moment of inertia ten to twenty times the mass moment inertia of said liquid column;

means for generating a compressive force for striking, in bursts and with force, the end of the liquid column opposite the open end (2) of the pipe in the direction of its axis in order to cause sudden acceleration of the liquid column, in such a way that a sound pressure pulse is generated and transmitted in the liquid column to the open end (2) of the pipe and from there is radiated as a sound pulse into the liquid, and is reflected as a rarefaction wave into the liquid column;

said means for generating including:
  a solid percussive body having a mass ten to twenty times greater than the mass of the liquid column;
  a stop; and
  a transfer piston means for axially confining the end of the liquid column opposite the open end of the pipe, said transfer piston means being movable through a selected distance of travel inside the pipe (1) to impact said stop (16); and
acceleration means for accelerating said solid percussive body and for causing said accelerated percussive body to strike said transfer piston means, such that the end of the liquid column adjacent to the closed end of the pipe is accelerated towards the open end of the pipe within a time interval shorter than that represented by twice the length of the liquid column divided by the velocity of sound in the liquid, thereby compressing said end of the liquid column adjacent to the closed end of the pipe.

3. A device according to claim 2, wherein the distance, of travel of the transfer piston means is adjustable.

4. The device of claim 3 wherein said pipe is rigid and has a mass selected to prevent transverse motion thereof.

5. A device for hydrodynamic sound pulse generation in a liquid, comprising:
  a pipe (1) open at one end and surrounding a column of said liquid of a selected length, the pipe (1) having the shape of a bell (4) at its open end;
  means for generating a compressive force for striking, in bursts and with force, the end of the liquid column opposite the open end (2) of the pipe in the direction of its axis in order to cause sudden acceleration or deceleration of the liquid column, in such a way that a sound pressure pulse is generated and transmitted in the liquid column to the open end (2) of the pipe and from there is radiated as a sound pulse into the liquid, and is reflected as a rarefaction wave into the liquid column;
  said means for generating including an acceleration means for accelerating a liquid mass and a means for causing the accelerated liquid to strike the end of the liquid column opposite the open end (2) of the pipe in the direction leading toward the open end of the pipe;
  wherein the acceleration means includes:
    a circular channel (18) containing said liquid mass and having an orifice (20) tangentially opening into the end of the liquid column opposite the open end (2) of the pipe;
    a flow drive means (19) for accelerating said liquid mass, said flow drive means (19) being located downstream from the orifice (20) in the circular channel (18); and
    a shut-off means (21) for shutting off a cross-section of the circular channel (18) located downstream from the orifice (20) after acceleration of the liquid mass.

6. The device of claim 5 wherein said pipe is rigid and has a mass selected to prevent transverse motion thereof.

7. A device for hydrodynamic sound pulse generation in a liquid, comprising:
  a pipe (1) open at one end and surrounding a column of said liquid of a selected length, the interior of said pipe encompassing said liquid having the shape of a bell (4) at its open end, said bell gradually and hyperbolically widening towards the open end of said pipe having a mass moment of inertia ten to twenty times the mass moment inertia of said liquid column;
  means for generating a compressive force for striking, in bursts and with force, the end of the liquid column opposite the open end (2) of the pipe in the direction of its axis in order to cause sudden acceleration of the liquid column, in such a way that a sound pressure pulse is generated and transmitted in the liquid column to the open end (2) of the pipe and from there is radiated as a sound pulse into the liquid, and is reflected as a rarefaction wave into the liquid column;
  said means for generating including:
    a solid percussive body having a mass ten to twenty times greater than the mass of the liquid column;
    a stop; and
    a transfer piston means for axially confining the end of the liquid column opposite the open end of the pipe, said transfer piston means being movable through a selected distance of travel inside the pipe (1) to impact said stop (16); and
  acceleration means for accelerating said solid percussive body and for causing said accelerated percussive body to strike said transfer piston means, such that the end of the liquid column adjacent to the closed end of the pipe is accelerated towards the open end of the pipe within a time interval shorter than that represented by twice the length of the liquid column divided by the velocity of sound in the liquid, thereby compressing said end of the liquid column adjacent to the closed end of the pipe.

* * * * *